Patented Aug. 23, 1932

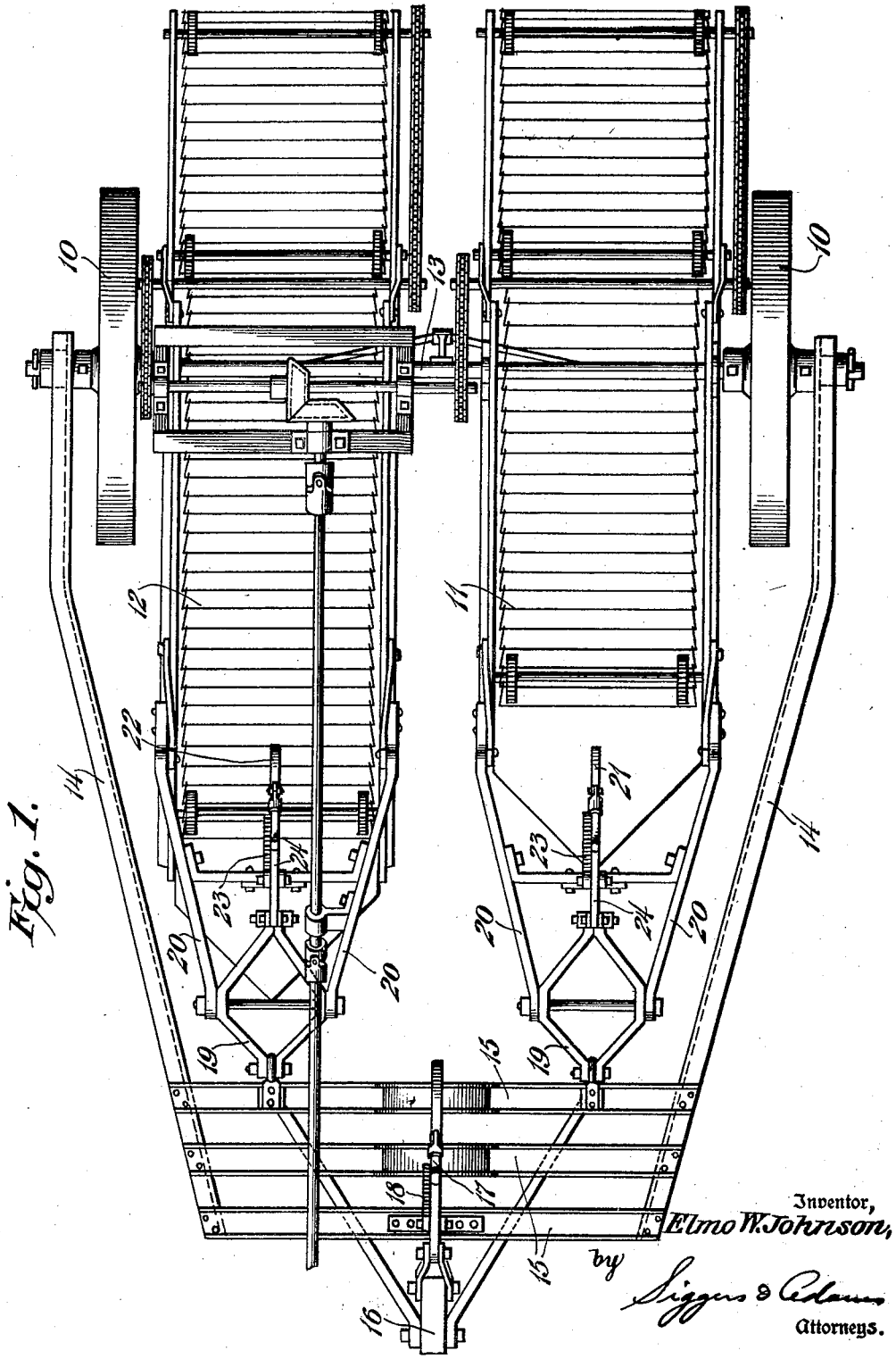

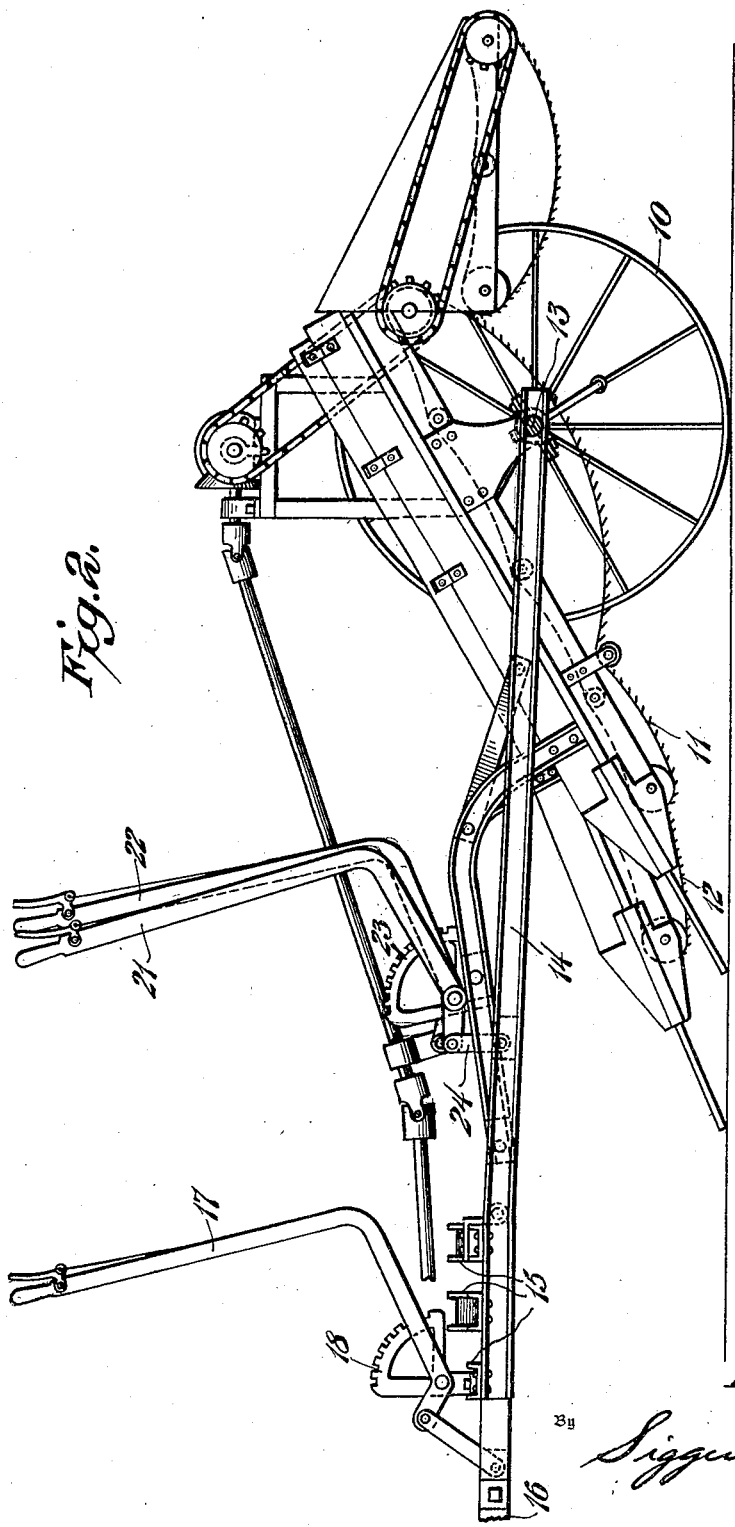

1,872,744

UNITED STATES PATENT OFFICE

ELMO W. JOHNSON, OF HICKSVILLE, NEW YORK, ASSIGNOR TO SYRACUSE CHILLED PLOW COMPANY, INC., OF SYRACUSE, NEW YORK, A CORPORATION OF NEW YORK

POTATO DIGGING MACHINE

Application filed November 19, 1929. Serial No. 408,299.

This invention relates to potato harvesting machines and aims to provide important improvements on the double-row digger shown and described in my Patent No. 1,721,122, dated July 16, 1929. One of the aims is to improve and simplify the main frame and its connections to the forward ends of the diggers so as to permit easy independent adjustments of the diggers; while another and more important aim is to improve the arrangement of the digger units so as to avoid clogging of the machine by weeds, vines or other débris.

In the accompanying drawings:

Fig. 1 is a top plan view of the preferred form of machine embodying the invention; and Fig. 2 is a side elevation of the machine shown in Fig. 1.

Multiple-row diggers, such as the one shown in my aforesaid patent are subject to some very serious drawbacks. First, it is difficult to adjust them independently so that they may be made to penetrate the soil to a uniform depth where the ground is of very irregular contour. Second, the front ends of the units oftentimes become clogged or choked up by weeds, vines and other débris, making it necessary to stop the machine and clean it out so that the potatoes will ride up the elevators instead of being thrown off the sides before they reach the elevators. This invention, therefore, aims to provide an improved and relatively simple construction and arrangement of parts to overcome the foregoing objections.

Referring particularly to the illustrative embodiment shown in the accompanying drawings, the machine is there shown as being of the same general type as that disclosed in my aforesaid patent. That is to say, it is mounted on a pair of wheels 10 and is adapted to be connected at its forward end to the rear end of a tractor (not shown). A pair of elevators 11 and 12 are pivotally mounted on the axle 13 between the wheels 10 and are arranged to be driven by the usual power take-off mechanism of the tractor in the same general manner as that disclosed in my patent.

In this example, the supporting frame and tractor hitch mechanism for the machine includes side frame elements or beams 14 connected to the outer ends of the axle 13 and connected at their forward ends by means of a plurality of cross bars or beams 15. A tractor draw bar 16 is shown as being pivotally and adjustably connected to these cross bars, the arrangement being such that a forward hand lever 17 cooperating with a notched segment 18 may be utilized to raise and lower the front end of the frame with respect to the draw bar or vice versa so as to vary the depth of both of the diggers simultaneously.

Herein, one of the digger units is shown as being shorter than the other. That is to say, the plow share of one of the units is arranged behind that of the other unit so as to permit weeds, vines and the like to pass readily between the units from the forward share and to the sides of the rear share. These units are both shown as being connected to one of the cross bars 15 by means of yoke members 19 pivotally connected intermediate their ends to brackets or draft bars 20 extending forwardly from the side frames of the units and suitably braced at the sides. These connections are such that the units may be independently and very quickly adjusted by means of hand levers 21 and 22 cooperating with notched segments 23 and connected by links 24 to the rear ends of the yoke members 19. The mode of adjusting each unit so as to vary its depth independently of the other unit is somewhat similar to that disclosed in my aforesaid patent wherein both units are connected to be adjusted independently and also in unison within certain limits. In this case, however, the adjustments of the individual units are always made independently of each other after draft bar adjustment is made and the machine is capable of a greater degree of adjustment.

Upon inspection of Fig. 1, it will be noted that the connection of the forward ends of the yokes 19 to one of the cross beams 15 at the front end of the frame is such that the units may be adjusted laterally for different widths of rows. However, potatoes are usually planted in rows of standard widths and it is therefore seldom necessary to make adjustments of this character. Since the idea of adjusting digger units laterally is claimed in my aforesaid patent, this feature requires no further description in this application.

From the foregoing description, it will be noted that the main frame of the machine affords support for the front ends of the digger units and relieves them of some of the stresses, thereby enabling the side frames to be made somewhat smaller and also contributing to easier relative adjustments of the units by their respective levers. Furthermore, as has been previously intimated, the units have a greater degree of adjustment so that they can be used on ground of very irregular contour. The arrangement of one unit in front of the other is a very important improvement in connection with the prevention of clogging up the machine and permitting the débris to pass between and to the sides of the units. Experience has demonstrated that the units which have their shares lying alongside of each other quickly become clogged up by potato vines and other débris as has been previously stated, and this oftentimes causes the potatoes to be deflected to one side of the shares without passing over the elevators. Practical operation of the improved machine has demonstrated that clogging is reduced practically to a minimum.

Obviously, the present invention is not restricted to the particular embodiment thereof herein shown and described. Moreover, it is not indispensable that all the features of the invention be used conjointly since they may be employed advantageously in various combinations and subcombinations.

What I claim is:—

1. A potato digging machine of the character described, comprising, in combination, a frame including a pair of side members; a pair of wheels and an axle between said side members at the rear end thereof; a plurality of cross beams connected to the forward ends of said frame members; a pair of digger units including plow shares and power driven elevating mechanism pivotally connected to said axle; yokes pivotally connecting the forward ends of said units to one of said cross beams; means associated with said yokes to vary the depths of penetration of said units independently of each other; and a drawbar adjustably connected to said cross beams to vary the depth of penetration of both of said units simultaneously.

2. In a multiple-row potato digging machine of the character described, a plurality of digger units each including a plow share and power driven elevating mechanism and means to adjust the depths of penetration of said units independently of each other, one of said units extending forwardly so that its plow share digs ahead of the other unit whereby to deflect débris to the sides of each unit and prevent the choking of the machine.

3. A potato digging machine of the character described comprising, in combination, a main frame including side frame elements and a cross beam arranged at the forward end; a pair of wheels and an axle supported between the side frame members at their rear ends; digger units including potato elevating mechanism pivotally connected to the axle; means for adjustably supporting the forward ends of the digger units on said cross beam at the forward end of the frame so as to vary the depths of penetration of the units independently of each other; and a drawbar to which said frame is pivotally and adjustably connected to vary the depth of penetration of both of said units simultaneously.

4. A potato digging machine of the character described, comprising, in combination, a main frame; a pair of wheels and an axle connected to the main frame at the rear end; a plurality of digging units including elevating mechanism pivotally connected to the forward end portion of the frame and independently adjustable with respect to the frame to vary the depth of penetration of the respective units; and a drawbar pivotally and adjustably connected with respect to the main frame to vary the depth of penetration of both of said units simultaneously.

5. In a multiple-row potato digging machine of the character described, a plurality of digger units, each including a plow share and power-driven elevating mechanism; one of said units extending forwardly so that its plow share digs ahead of the other unit whereby to deflect débris to the sides of each unit and prevent the choking of the machine; and hand-operable means associated with each unit to adjust the depths of penetration of said units independently of each other; said means all being in substantially the same transverse plane so as to bring them both within reach of the operator.

6. A potato digging machine comprising, in combination, a main frame; a pair of wheels and an axle connected to the main frame at the rear end; a plurality of potato handling units including elevating mechanism mounted in said frame, one of said units being adjustable relative to the other to vary the tilt thereof; and a drawbar pivotally and adjustably connected with respect to the main frame to vary the tilt of both of said units simultaneously.

In testimony that I claim the foregoing as my own, I have hereto affixed my signature.

ELMO W. JOHNSON.